United States Patent
Samec et al.

(10) Patent No.: US 10,421,861 B2
(45) Date of Patent: *Sep. 24, 2019

(54) COMPOSITION COMPRISING ESTERS OF LIGNIN AND OIL OR FATTY ACIDS

(71) Applicant: REN FUEL K2B AB, Stockholm (SE)

(72) Inventors: Joseph Samec, Spanga (SE); Joakim Löfstedt, Uppsala (SE); Christian Dahlstrand, Uppsala (SE); Alexander Orebom, Uppsala (SE); Supaporn Sawadjoon, Uppsala (SE)

(73) Assignee: REN FUEL K2B AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,271

(22) Filed: Jun. 21, 2018

(65) Prior Publication Data

US 2018/0319985 A1 Nov. 8, 2018

Related U.S. Application Data

(63) Continuation of application No. 15/104,702, filed as application No. PCT/SE2014/051507 on Dec. 16, 2014, now Pat. No. 10,030,147.

(30) Foreign Application Priority Data

Dec. 16, 2013 (SE) ........................ 1351508
Jun. 19, 2014 (SE) ........................ 1450764
Nov. 3, 2014 (SE) ........................ 1451310

(51) Int. Cl.
*C10M 107/20* (2006.01)
*C08L 97/00* (2006.01)
(Continued)

(52) U.S. Cl.
CPC .............. *C08L 97/005* (2013.01); *C07G 1/00* (2013.01); *C08H 6/00* (2013.01); *C10L 1/026* (2013.01);
(Continued)

(58) Field of Classification Search
CPC .......... C10M 107/20; C07G 1/00; C08H 7/00; C08L 97/00
(Continued)

(56) References Cited

U.S. PATENT DOCUMENTS 2,410,578 A 11/1946 Giammaria
2,429,102 A 10/1947 Lewis et al.
(Continued)

FOREIGN PATENT DOCUMENTS

GB 593735 10/1947
WO 2012005784 A1 1/2012
(Continued)

OTHER PUBLICATIONS

Zhang, Ai-Ping; Mei, Lian; Zhao, Zhi-Zeng; Xie, Jun; Liu, Chuan-Fu; Sun, Run-Gang; "Homogeneous esterification of Eucalyptus with palmitoyl chloride at room temperature"; Jul. 9, 2013; BioResources (2013), 8(3), pp. 4288-4297. ISSN: 1930-2126. Institute of New Energy and New Material, South China Agricultural University, Guangzhou, 510642, Peop. Rep. China.; pp. 4288-4289; p. 4290, line 34-line 38.

(Continued)

*Primary Examiner* — Ellen M McAvoy

(74) *Attorney, Agent, or Firm* — Harness, Dickey & Pierce, P.L.C.

(57) ABSTRACT

The present invention relates to a composition comprising a carrier liquid and lignin or lignin derivatives; wherein at least one of the hydroxyl groups of the biomass have been substituted with ester groups and wherein the carrier liquid (Continued)

| Ester group | Sub. degree % | EA weight% | EtOH weight% | MeTHF weight% | CPME weight% | furfural weight% | iPrOH weight% | RTD weight% | LGO weight% | oleic acid weight% | methyl oleate weight% |
|---|---|---|---|---|---|---|---|---|---|---|---|
| C18-$\omega$9 | 85 | 53 | 53 | 47 | 55 | 53 | 54 | 43 | 48 | *47* | 48 |
| C18-$\omega$9 | 60 | 51 | 52 | 46 | 42 | 43 | 51 | 28 | 37 | *26* | 35 |
| C18-$\omega$9 | 50 | 38 | 42 | 43 | 44 | 38 | 50 | 34 | 33 | *26* | 30 |
| C18-$\omega$9 | 40 | 36 | 45 | 42 | 35 | 38 | 43 | *13* | *6* | *5* | 25 |
| C8 | 100 | 30 | 34 | 31 | 38 | 31 | 30 | 30 | 28 | 34 | 35 |
| C10 | 100 | *26* | 36 | 35 | 32 | *27* | 32 | 31 | 30 | 32 | *29* |

Bold=Fully dissolved

*Italic* = not dissolved is a gas oil. The composition may be used for preparing fuels or lubricants.

24 Claims, 5 Drawing Sheets

(51) Int. Cl.
*C07G 1/00* (2011.01)
*C11C 3/00* (2006.01)
*C08H 7/00* (2011.01)
*C10L 1/02* (2006.01)

(52) U.S. Cl.
CPC ............. *C10M 107/20* (2013.01); *C11C 3/00* (2013.01); *C10L 2200/0469* (2013.01); *C10M 2209/003* (2013.01)

(58) Field of Classification Search
USPC .................................. 508/216; 530/500–507
See application file for complete search history.

(56) References Cited

U.S. PATENT DOCUMENTS

| | | | |
|---|---|---|---|
| 5,484,896 A | 1/1996 | Naieni | |
| 5,614,564 A | 3/1997 | Hwang et al. | |
| 6,172,204 B1 | 1/2001 | Sarkanen | |
| 7,300,705 B2 | 11/2007 | Neogi | |
| 7,959,765 B2 | 6/2011 | Argyropoulos | |
| 7,994,375 B2 | 8/2011 | Marker | |
| 8,182,557 B2 | 5/2012 | Argyropoulos | |
| 8,378,020 B1 | 2/2013 | Balakshin | |
| 8,809,426 B2 | 8/2014 | Coa | |
| 8,865,802 B2 | 10/2014 | Coa | |
| 9,000,075 B2 | 4/2015 | Coa | |
| 9,222,223 B1 | 12/2015 | Luo | |
| 9,340,425 B2 | 5/2016 | Thunga | |
| 10,030,147 B2* | 7/2018 | Samec .................... C07G 1/00 | |
| 2010/0152428 A1 | 6/2010 | Gifford | |
| 2010/0305241 A1 | 12/2010 | Balakshin | |
| 2011/0274612 A1 | 11/2011 | Wohlmann | |
| 2013/0178563 A1* | 7/2013 | Balakshin ................ C08H 6/00 524/72 |
| 2013/0303711 A1 | 11/2013 | Coa | |
| 2013/0338347 A1 | 12/2013 | Cao | |
| 2014/0249271 A1 | 9/2014 | Pietarinen | |
| 2015/0068112 A1 | 3/2015 | Varvemaa | |
| 2015/0166836 A1 | 6/2015 | Liu | |
| 2015/0232497 A1 | 8/2015 | Pietarinen | |
| 2015/0361266 A1 | 12/2015 | Samec | |
| 2016/0185809 A1* | 6/2016 | Streffer .................... C08H 6/00 530/507 |
| 2016/0237194 A1 | 8/2016 | Piertarinen | |
| 2016/0355535 A1 | 12/2016 | Venditti | |

FOREIGN PATENT DOCUMENTS

| | | |
|---|---|---|
| WO | 2012092644 A1 | 7/2012 |
| WO | 2013050661 A1 | 4/2013 |
| WO | 2014029919 A1 | 2/2014 |
| WO | 2015137868 A1 | 3/2015 |

OTHER PUBLICATIONS

Hult E-L; Ropponen J; Poppius-Levlin K; Ohra-Aho T; Tamminen T; ."Enhancing the barrier properties of paper board by a novel lignin coating" ; Industrial Crops and Products 50 (2013); Oct. 2013; pp. 694-700. ISSN: 0926-6690, VTTTechnical Research Centre of Finland, P.O. Box 1000, FI-02044 VTT; p. 695, line 15-line 20; p. 695, line 23-line 28; p. 696, line 18-line 22.
Clark, Joseph C.; Brauns, F. E . "Esters of certain lignin derivatives". Paper Trade Journal (1944), 119(No. 6), 33-6 .. pp. 53-56. ISSN: 0031-1197; p. 53, line 45-line 50; p. 54, line 34-line 55.
H.F. Lewis et al; Lignin Esters of Mono and Dibasic Aliphatic Acids; Industrial and Engineering Chemistry; V 35, No. 10. p. 1113-1117; Oct. 1943.
Wm. Thielemans et al.; Lignin Esters for Use in Unsaturated Thermosets: Lignin Modification and Solubility Modeling; Bioacromolecules 2005, 6, 1895-1905.
F E Brauns et al "Lignin Ethers and Esters . . . "; Industrial and Engineering Chemistry, vol. 37, No. 1, pp. 70-73, Jan. 1945.
R P Wool et al.; Handbook "Bio-Based Polymers and Composites", Chapter 16.3, Ligning Modification, 2011, pp. 562.
G W Huber et al.,; Synergies between Bio- and Oil Refineries for the production of Fuels from Biomass, 20007, Angew. Chem. Int. Ed. 2007, 46, pp. 7184-7201.
Rolf Lundqvist; Studies on tall oil components; I. Ester of lignin fragments in neutral fraction of tall oil; Archive for Chemistry, Uppsala Nov. 6, 1963; Bd. 21, No. 45, pp. 497-501.
Rolf Lundqvist; Studies on tall oil components; II. Fatty acid composition of lignin ester; Archive for Chemistry; Uppsala Aug. 18, 1966; Bd 25, No. 39, pp. 429-434.

* cited by examiner

| Ester group | Sub. degree % | EA weight% | EtOH weight% | MeTHF weight% | CPME weight% | furfural weight% | iPrOH weight% | RTD weight% | LGO weight% | oleic acid weight% | methyl oleate weight% |
|---|---|---|---|---|---|---|---|---|---|---|---|
| C18-u9 | 85 | 53 | 53 | 47 | 55 | 53 | 54 | 43 | 48 | 47 | 48 |
| C18-u9 | 60 | 51 | 52 | 46 | 42 | 43 | 51 | 28 | 37 | 26 | 35 |
| C18-u9 | 50 | 38 | 42 | 43 | 44 | 38 | 50 | 34 | 33 | 26 | 30 |
| C18-u9 | 40 | 36 | 45 | 42 | 35 | 38 | 43 | 13 | *6* | *5* | 25 |
| C8 | 100 | 30 | 34 | 31 | 38 | 31 | 30 | 30 | 28 | 34 | 35 |
| C10 | 100 | 26 | 36 | 35 | 32 | 27 | 32 | 31 | 30 | 32 | 29 |

Bold=Fully dissolved

*Italic* = not dissolved

Figure 1

| Lignin | Sub. Degree % (eq.) | EA w% | EtOH w% | MeTHF w% | CPME w% | furfural w% | iPrOH w% | RTD w% | LGO w% | oleic acid w% | methyl oleate w% |
|---|---|---|---|---|---|---|---|---|---|---|---|
| LGTPA2 | 0 | 2 | n/a | 2 | 2 | 42 | 3 | n/a | n/a | n/a | n/a |
| C2 | 100 (0.92) | 50 | 56 | 53 | 12 | 48 | 11 | not dissolved | 4 | 5 | 4 |
| C4 | 100 (1.33) | 46 | 47 | 40 | 41 | 39 | 38 | 5 | 4 | 5 | 4 |
| C6 | 100 (1.43) | 50 | 56 | 53 | 42 | 38 | 56 | 25 | 7 | 27 | 30 |
| C6-ω3 | 100 (0.91) | 69 | 59 | 52 | 48 | 42 | 44 | 9 | 8 | 10 | 8 |
| C12 | 100 (1.09) | 56 | 70 | 57 | 49 | 59 | 60 | 48 | 46 | 48 | 47 |
| C14 | 100 (1.27) | 41 | 52 | 56 | 48 | 42 | 53 | 42 | 46 | 47 | 41 |
| C14 | 20 (0.26) | 49 | 54 | 53 | 35 | 36 | 44 | 9 | 8 | 9 | 9 |
| C14 | 9 (0.12) | 8 | 65 | 42 | 8 | 50 | 9 | 8 | 9 | 10 | 8 |
| C18 | 100 (1.22) | 77 | 72 | 79 | 77 | 71 | 72 | 61 | 62 | 66 | 62 |
| C18 (at RT) | 100 (1.22) | 51 | n/a | 42 | 54 | n/a | n/a | 37 | 39 | 33 | 44 |
| C18 | 25 (0.31) | 52 | 57 | 57 | 41 | 52 | 57 | 7 | 8 | 11 | 9 |
| C18 | 9 (0.11) | 7 | 61 | 51 | 8 | 53 | 8 | 8 | 9 | 8 | 7 |
| C18-ω9 (at RT) | 100 (1.24) | 66 | n/a | 58 | 62 | 53 | n/a | 45 | 52 | 49 | 60 |
| C18-ω9 | 16 (0.20) | 48 | 65 | 57 | 44 | 56 | 57 | 8 | 8 | 17 | 8 |
| C18-ω9 | 5 (0.056) | 7 | 64 | 54 | 8 | 54 | 8 | 7 | 9 | 7 | 8 |
| C18-ω6-ω9 | ~10 (0.096) | 7 | 59 | 39 | 6 | 41 | 9 | 8 | 11 | 10 | 9 |
| C22 | 100 (1.35) | 83 | 11 | 76 | 67 | 66 | 75 | 57 | 45 | 48 | 48 |
| C22 | 18 (0.24) | 50 | 67 | 55 | 43 | 40 | 49 | 9 | 11 | 6 | 11 |
| C22 | 7 (0.088) | 9 | 61 | 40 | 7 | 52 | 45 | 7 | 10 | 9 | 9 |

Figure 2A

| | | 62 | 63 | 75 | 62 | 56 | 56 | 41 | 46 | 48 | 53 |
|---|---|---|---|---|---|---|---|---|---|---|---|
| C22-ω9 | 100 (1.07) | 62 | 63 | 75 | 62 | 56 | 56 | 41 | 46 | 48 | 53 |
| C22-ω9 | 17 (0.18) | 46 | 53 | 53 | 43 | 40 | 51 | *6* | *12* | *9* | *10* |
| C22-ω9 | 6 (0.061) | *8* | 49 | 43 | *8* | 37 | 43 | *8* | *10* | *9* | *8* |
| GM63-C2 | 100 (0.94) | 49 | 64 | 54 | *12* | 60 | 56 | *10* | *10* | *12* | *9* |
| GM63-RTD | ~24 (0.24) | 51 | 63 | 60 | 38 | 50 | 57 | *13* | *9* | *13* | *9* |
| CF-C2 | 100 (1.08) | 55 | 62 | 62 | *9* | 59 | 60 | *9* | *11* | *12* | *11* |
| CF-RTD | ~18 (0.18) | 59 | 64 | 56 | 52 | 58 | 55 | *8* | *9* | *12* | *9* |
| C18-ω9:C2 | 27 (0.31): 73 (0.83) | 63 | 68 | 64 | 57 | 59 | 62 | *5* | *6* | *6* | 28 |

LGTPA2=Lignin type A2

Bold=Fully dissolved

*Italic* = not dissolved

Figure 2B

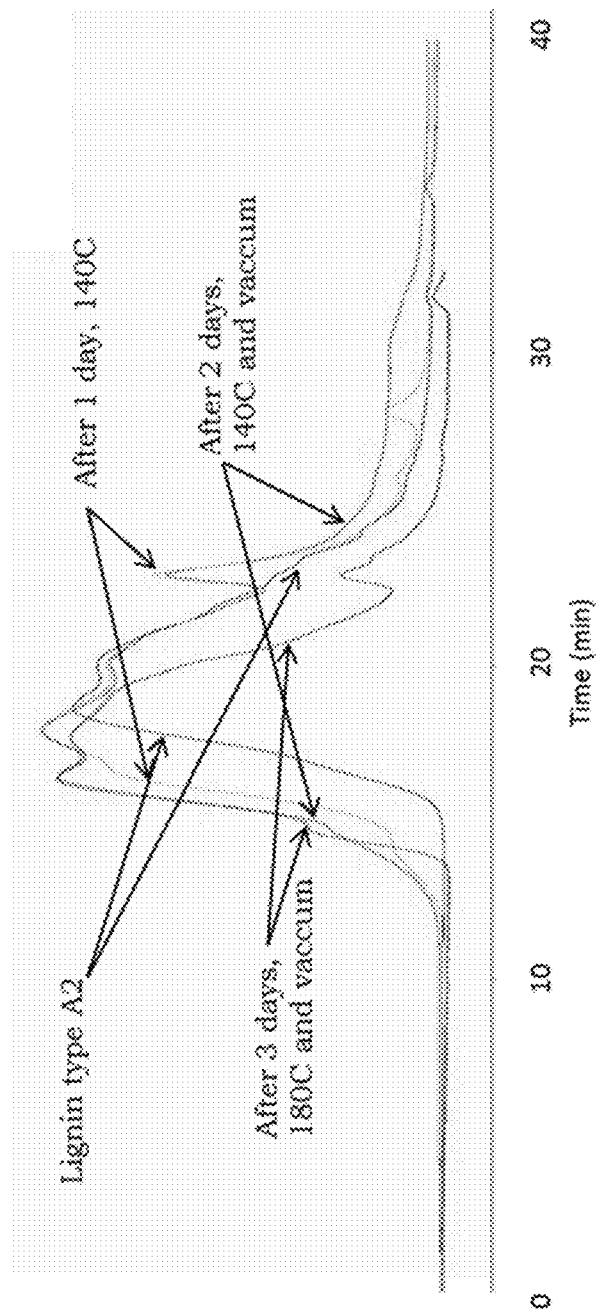

COMPOSITION COMPRISING ESTERS OF LIGNIN AND OIL OR FATTY ACIDS

FIELD OF THE INVENTION

The present invention relates to a composition with a high lignin content in a fatty acid or oil where the lignin has been functionalized with ester groups and a method of preparing said composition where the esterification step may be performed in the fatty acid or oil. The composition may be used to produce fuels.

BACKGROUND

There is an increasing interest in using biomass as a source for fuel production. Biomass includes, but is not limited to, plant parts, fruits, vegetables, processing waste, wood chips, chaff, grain, grasses, corn, corn husks, weeds, aquatic plants, hay, paper, paper products, recycled paper and paper products, lignocellulosic material, lignin and any cellulose containing biological material or material of biological origin.

An important component of biomass is the lignin present in the solid portions of the biomass. Lignin comprises chains of aromatic and oxygenate constituents forming larger molecules that are not easily treated. A major reason for difficulty in treating the lignin is the inability to disperse the lignin for contact with catalysts that can break the lignin down.

Lignin is one of the most abundant natural polymers on earth. One common way of obtaining lignin is by separation from wood during pulping processes. Only a small amount (1-2%) is utilized in specialty products whereas the rest primary serves as fuel. Even if burning lignin is a valuable way to reduce usage of fossil fuel, lignin has significant potential as raw material for the sustainable production of chemicals and liquid fuels.

Various lignins differ structurally depending on raw material source and subsequent processing, but one common feature is a backbone consisting of various substituted phenyl propane units that are bound to each other via aryl ether or carbon-carbon linkages. They are typically substituted with methoxy groups and the phenolic and aliphatic hydroxyl groups provide sites for e.g. further functionalization. Lignin is known to have a low ability to adsorb water compared to for example the hydrophilic cellulose.

Today lignin may be used as a component in for example pellet fuel as a binder but it may also be used as an energy source due to its high energy content. Lignin has higher energy content than cellulose or hemicelluloses and one gram of lignin has on average 2.27 kJ, which is 30% more than the energy content of cellulosic carbohydrate. The energy content of lignin is similar to that of coal. Today, due to its fuel value lignin that has been removed using the Kraft process, sulphate process, in a pulp or paper mill, is usually burned in order to provide energy to run the production process and to recover the chemicals from the cooking liquor.

There are several ways of separating lignin from black or red liquor obtained after separating the cellulose fibres in the Kraft or sulphite process respectively, during the production processes. One of the most common strategies is ultra-filtration. Lignoboost® is a separation process developed by Innventia AB and the process has been shown to increase the lignin yield using less sulphuric acid. In the Lignoboost® process, black liquor from the production processes is taken and the lignin is precipitated through the addition and reaction with acid, usually carbon dioxide ($CO_2$), and the lignin is then filtered off. The lignin filter cake is then re-dispersed and acidified, usually using sulphuric acid, and the obtained slurry is then filtered and washed using displacement washing. The lignin is usually then dried and pulverized in order to make it suitable for lime kiln burners or before pelletizing it into pellet fuel.

Biofuel, such as biogasoline and biodiesel, is a fuel in which the energy is mainly derived from biomass material or gases such as wood, corn, sugarcane, animal fat, vegetable oils and so on. However the biofuel industries are struggling with issues like food vs fuel debate, efficiency and the general supply of raw material. At the same time the pulp or paper making industries produces huge amounts of lignin which is often, as described above, only burned in the mill. Two common strategies for exploring biomass as a fuel or fuel component are to use pyrolysis oils or hydrogenated lignin.

In order to make lignin more useful one has to solve the problem with the low solubility of lignin in organic solvents. One drawback of using lignin as a source for fuel production is the issue of providing lignin or lignin derivatives in a form suitable for hydrotreaters or crackers. The problem is that lignin is not soluble in oils or fatty acids which is, if not necessary, highly wanted.

Prior art provides various strategies for degrading lignin into small units or molecules in order to prepare lignin derivatives that may be processed. These strategies include hydrogenation, dexoygenation and acid catalyst hydrolysis. WO2011003029 relates to a method for catalytic cleavage of carbon-carbon bonds and carbon-oxygen bonds in lignin. US20130025191 relates to a depolymerisation and deoxygenation method where lignin is treated with hydrogen together with a catalyst in an aromatic containing solvent. All these strategies relates to methods where the degradation is performed prior to eventual mixing in fatty acids or oils. WO2008157164 discloses an alternative strategy where a first dispersion agent is used to form a biomass suspension to obtain a better contact with the catalyst. These strategies usually also requires isolation of the degradation products in order to separate them from unwanted reagents such as solvents or catalysts.

The economic benefits of producing fuels from biomass depend for example on an efficient process for preparing the lignin and on the preparation of the lignin or lignin derivatives so that the fuel production is as efficient as possible. For example the amount of oxygen should be as low as possible and the number of preparation steps should be as few as possible.

SUMMARY OF THE INVENTION

The object of the present invention is to overcome the drawbacks of solubility of the prior art. The present invention relates to a composition comprising a high content of lignin or lignin derivatives in a fatty acid, esterified fatty acid or oil and optionally an organic solvent as well. In order to obtain a high content of lignin it have been functionalized or modified by esterification of the hydroxyl groups. One application for the composition may be as a raw material for fuel production or for the preparation of lubricating oils.

The present invention facilitates the preparation of a composition suitable for fuel production which does not require pre-preparation steps such as degradation and isolation steps. Instead the functionalization of the biomass may be prepared in the carrier liquid in situ. Furthermore, the composition according to the present invention may be used as it is to prepare fuel or it may be added into to a production stream at a refinery. The composition may be mixed with well-known carrier liquids (oils for example).

In the widest aspect the present invention relates to composition comprising a carrier liquid and lignin or lignin derivatives solubilized in said carrier liquid; wherein at least one of the hydroxyl groups of the lignin or lignin derivatives have been substituted with ester groups forming esterified lignin or lignin derivatives.

The hydroxyl groups of the lignin or lignin derivative may be substituted with ester groups of a fatty acid, preferably an unsaturated fatty acid.

In a second aspect the present invention relates to a method of preparing the composition according to the present invention comprising:
 a. Providing a carrier liquid,
 b. Providing lignin or lignin derivatives;
 c. Providing an esterification agent or, a fatty acid and an esterification agent, and optionally a catalyst;
 d. Mixing the components of step b and c;
 e. Heating the mixture to at least 80° C.;
 f. Letting the components react in order to obtain esterified biomass material;
 g. Optionally isolating the esterified biomass material; and
 h. Mixing the esterified biomass material with the carrier liquid.

In a third aspect the present invention relates to a product obtainable by the method of the present invention.

In a fourth aspect the present invention relates to the use of the method to prepare compositions for fuel production.

In a fifth aspect the present invention relates to a method of making fuel by treating the composition according to the present invention in a hydrotreater or a catalytic cracker.

In a sixth aspect the present invention relates to a fuel obtained from the composition according to the present invention.

In a seventh aspect the present invention relates to the use of the composition to prepare fine chemicals such as aromatic compounds.

BRIEF DESCRIPTION OF FIGURES

FIG. 1, table of solubility for esterified lignin in various solvents and carrier liquids (values given as weight % esterified lignin).

FIGS. 2A and 2B, table of solubility for esterified lignin in various solvents and carrier liquids (values given as weight % esterified lignin).

Figure 4:
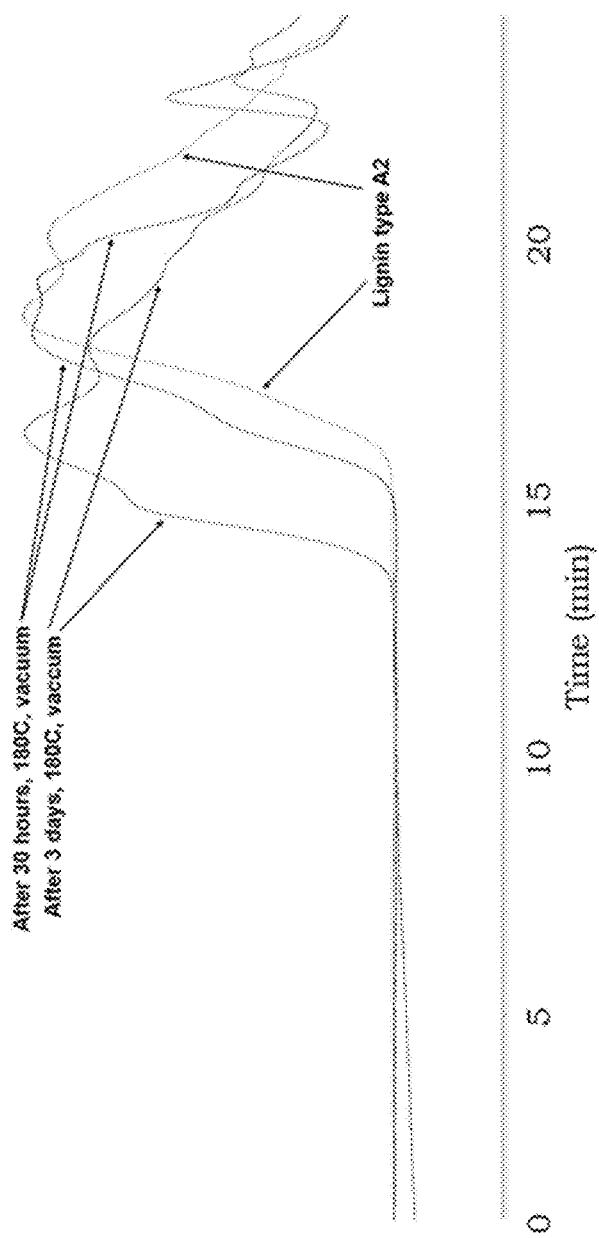

(EA=ethyl acetate, EtOH=ethanol, MeTHF=methylated tetrahydrofuran, CPME=cyclocpentyl methyl ether, iPrOH=iso-propanol, RTD=tall oil, LGO=light gas oil, CF=membrane filtered lignin, LGTPA=acid precipitated lignin from black liquor dried to 95% dry weight and GM63=lignin chemically reduced using the method according to WO2012/121659)

FIG. 3, GPC of esterified lignin according to the present invention.

FIG. 4, GPC of esterified lignin according to the present invention.

DETAILED DESCRIPTION OF THE INVENTION

The present invention presents a composition for use in refinery processes for the production of various fuels.

In the present application the term "lignin" means a polymer comprising coumaryl alcohol, coniferyl alcohol and sinapyl alcohol monomers.

In the present application the term "lignin derivative" means molecules or polymers derived from lignin. In the present application "lignin derivative" and "molecules or polymers derived from lignin" are used interchangeably. These molecules or polymers may be a result of chemical modification or degradation of lignin or a lignin source, for example when treating black or red liquor in order to precipitate or separate lignin. The number average molecular weight ($M_n$) of the lignin derivative may be 500 g/mol or higher, or 800 g/mol or higher, for example 500-2000 g/mol, or 700-1500 g/mol.

In the present application the term "carrier liquid" means a liquid selected from fatty acids or mixture of fatty acids, esterified fatty acids, rosin acid, crude oil, mineral oil and hydrocarbon oils or mixtures thereof.

In the present invention the term "oil" means a nonpolar chemical substance that is a viscous liquid at ambient temperature and is both hydrophobic and lipophilic.

In the present application the terms "red liquor" and "brown liquor" denote the same liquor.

When calculating number of repeating units and equivalents one repeating unit of lignin is assumed to be 180 Da. The degree substitution is calculated from 1H NMR using an internal standard, and 1-eq substitution degree is defined as a presence of one covalently attached acyl group per one lignin monomer. For example to achieve close to complete substitution we have used a twofold excess of acylating agent per one lignin monomer, which afforded substitution degrees ranging from 0.91 to 1.43 equivalents For a substance to be processed in a refinery such as an oil refinery or bio oil refinery, the substance needs to be in liquid phase. Either the substance is in liquid phase at a given temperature (usually below 80° C.) or the substance is solvated in a liquid. In the present patent application, such liquid will be given the term carrier liquid. The present invention presents a composition and a method of preparing said composition where the composition comprises a biomass material, preferably lignin or lignin derivatives, where the biomass material is in liquid phase and may be processed in a refinery. The present invention makes it easier or even facilitates production of fuel from biomass material.

In order to obtain lignin biomass may be treated in any suitable way known to a person skilled in the art. The biomass may be treated with pulping processes or organosolv processes for example. Biomass includes, but is not limited to wood, fruits, vegetables, processing waste, chaff, grain, grasses, corn, corn husks, weeds, aquatic plants, hay, paper, paper products, recycled paper, shell, brown coal, algae, straw, bark or nut shells, lignocellulosic material, lignin and any cellulose containing biological material or material of biological origin. In one embodiment the biomass is wood, preferably particulate wood such as saw dust or wood chips. The wood may be any kind of wood, hard or soft wood, coniferous tree or broad-leaf tree. A non-limiting list of woods would be pine, birch, spruce, maple, ash, mountain ash, redwood, alder, elm, oak, larch, yew, chestnut, olive, cypress, banyan, sycamore, cherry, apple, pear, hawthorn, *magnolia*, *sequoia*, walnut, karri, coolabah and beech.

It is preferred that the biomass contains as much lignin as possible. The Kappa number estimates the amount of chemicals required during bleaching of wood pulp in order to obtain a pulp with a given degree of whiteness. Since the amount of bleach needed is related to the lignin content of the pulp, the Kappa number can be used to monitor the effectiveness of the lignin-extraction phase of the pulping process. It is approximately proportional to the residual lignin content of the pulp.

$$K \approx c*l$$

K: Kappa number; c: constant≈6.57 (dependent on process and wood); l: lignin content in percent. The Kappa number is determined by ISO 302:2004. The kappa number may be 20 or higher, or 40 or higher, or 60 or higher. In one embodiment the kappa number is 10-100.

Biomass materials and derivatives thereof often have a general formula of $C_xH_yO_z$ where the ratio z/x depends on origin, part of the plant and also processes of the biomass material, and where x and y each are ≥1 and z≥0. Preferably x is ≥2, or more preferably x is ≥3, or more preferably x is ≥6; z is preferably ≥1, or ≥2. In one embodiment x is ≤20, in another embodiment x is ≤15, and in yet another embodiment x is ≤11. In one embodiment z is ≤10 and in another embodiment z is ≤5. The biomass material may comprise other heteroatoms such as S or N.

The lignin may be in the form of a mixture of biomass materials and derivatives thereof. In one embodiment the lignin is in the form of black or red liquor. Black and red liquor contains cellulose, hemi cellulose and lignin and derivatives thereof.

The composition according to the present invention may comprise black or red liquor, or lignin or lignin derivatives obtained from black or red liquor.

Black liquor comprises four main groups of organic substances, around 30-45 weight % ligneous material, 25-35 weight % saccharine acids, about 10 weight % formic and acetic acid, 3-5 weight % extractives, about 1 weight % methanol, and many inorganic elements and sulphur. The exact composition of the liquor varies and depends on the cooking conditions in the production process and the feedstock. Red liquor comprises the ions from the sulfite process (calcium, sodium, magnesium or ammonium), sulfonated lignin, hemicellulose and low molecular resins.

The lignin may be Kraft lignin, sulfonated lignin, Lignoboost® lignin, precipitated lignin, filtrated lignin, acetosolv lignin or organosolv lignin. In one embodiment the lignin is Kraft lignin, acetosolv lignin or organosolv lignin. In another embodiment the lignin is Kraft lignin. In another embodiment the lignin is organosolv lignin. In another embodiment the lignin or lignin derivatives obtained as residual material from ethanol production. The lignin may be in particulate form with a particle size of 5 mm or less, or 1 mm or less.

Lignin is not soluble in most organic solvents, fatty acids or oils. Instead prior art have presented various techniques to depolymerize and covert the depolymerized lignin into components soluble in the wanted media.

The number average molecular weight (mass) ($M_n$) of the lignin may be 30,000 g/mol or less, such as not more than 20,000 g/mol, or not more than 10,000 g/mol, or not more than 5,000 g/mol, or not more than 2,000 g/mol, or not more than 1,000 g/mol, or higher than 800 g/mol, or higher than 950 g/mol. In one embodiment the number average molecular weight of the lignin is between 150 and 4,000 g/mol, or between 300 and 1,000 g/mol.

The esterified lignin or lignin derivative may have a number average molecular weight ($M_n$) of 300 g/mol or more, or 1,000 g/mol or more, or 2,000 g/mol or more, or 5,000 g/mol or more, or 8,000 g/mol or more but less than 10,000 g/mol. In one embodiment the number average molecular weight ($M_n$) is 1,000 to 6,000 g/mol, or 2,000 g/mol to 4,000 g/mol.

The purpose of the carrier liquid is to carry the wanted substrate or solution into the reactor without reacting or in any other way affecting the substrate or solution. Therefore, in one embodiment of the present application the carrier liquid is an inert hydrocarbon with a high boiling point, preferably at least 150° C.

The carrier liquid should preferably be suitable for a hydrotreater or a catalytic cracker (cat cracker), preferably a liquid suitable for both hydrotreater and catalytic cracker. Hydrotreating and catalytic cracking are steps in the refinery process where the sulfur, oxygen and nitrogen contents of the oil is reduced and where high-boiling, high molecular weight hydrocarbons are converted into gasoline, diesel and gases. In one embodiment the carrier liquid is a fatty acid or a mixture of fatty acids. In another embodiment the carrier liquid is esterified fatty acids such as FAME (fatty acid methyl ester). The fatty acid used in the present invention (as fatty acid or as esterified fatty acid) may be a C4 or longer fatty acid, or C8 or longer fatty acid, or a C14 or longer fatty acid. In one embodiment the fatty acid or the mixture of the fatty acids or the esterified fatty acid comprises unsaturated fatty acids, preferably at a concentration of more than 25 wt %, or more than 50 wt %. In one embodiment the carrier liquid is a tall oil. In one embodiment the carrier liquid is a crude oil. In another embodiment the carrier liquid is a hydrocarbon oil or a mineral oil. In yet another embodiment the carrier liquid is a mixture of a fatty acid and crude oil, or a hydrocarbon oil or a mineral oil. The ratio in said mixture may be 5-90 wt % (of the total weight of the carrier liquid) fatty acid or esterified fatty acid and 10-95 wt % of hydrocarbon oil or mineral oil, for example 10-40 wt % fatty acid or esterified fatty acid and 60-90 wt % of hydrocarbon oil or mineral oil. The purpose of using esterified fatty acid instead of fatty acid is to limit the corrosive properties of the acid groups of the fatty acid. In one embodiment at least 80% of the acid groups of the fatty acid is esterified, preferably at least 95%.

When the carrier liquid is or comprises a crude oil, hydrocarbon oil or mineral oil the oil needs to be in liquid phase below 80° C. and preferably have boiling points of 177-371° C. These hydrocarbon oils include different types of or gas oils and likewise e.g. Full Range Straight Run Middle Distillates, Hydrotreated, Middle Distillate, Light Catalytic Cracked Distillate, Naphtha full-range straight-run distillates, hydrodesulfurized full-range distillates, solvent-dewaxed straight-range distillates, straight-run middle sulfenylated, Naphtha clay-treated full-range straight run distillates full-range atm, hydrotreated full-range distillates, straight-run light distillates heavy straight-run, straight-run middle-run, Naphtha (shale oil), hydrocracked, full-range straight run (example of but not restricted to CAS nr: 68476-30-2, 68814-87-9, 74742-46-7, 64741-59-9, 64741-44-2, 64741-42-0, 101316-57-8, 101316-58-9, 91722-55-3, 91995-58-3, 68527-21-9, 128683-26-1, 91995-46-9, 68410-05-9, 68915-96-8, 128683-27-2, 195459-19-9). Moreover substances can be solvated in lighter hydrocarbon fractions such as organic solvents e.g. mesitylene, toluene, benzene, petroleum ether, octanes, nonanes, decanes and also isomerized derivatives of these compounds or mixtures thereof (CAS nr: 108-88-3, 108-67-8, 71-43-2, 8032-32-4, 111-65-9, 111-84-2, 124-18-5).

When the carrier liquid is a fatty acid (second fatty acid) said fatty acid may be but is not limited to C6-C18 fatty acids, saturated or unsaturated, or a mixtures of C2-C18 fatty acids. The fatty acid may further be methylated or ethylated. The second fatty acid may be a vegetable fatty acid such as a tall oil fatty acid (TOFA), or olive oil, soybean oil, corn oil, hemp or coconut oil, but can also be derived from animal fats. In one embodiment the first and the second fatty acid are the same.

In one embodiment the carrier liquid is a second fatty acid or a mixture of second fatty acids or a mixture comprising a second fatty acid and a hydrocarbon oil. In one embodiment the second fatty acid is an unsaturated fatty acid or is a mixture of fatty acids in which the mixture contains unsaturated fatty acids. In one embodiment the first and the second fatty acids are the same, for example tall oils.

The composition may comprise 10-99 weight % of carrier liquid, such as 20 weight % or more, or 40 weight % or more, or 60 weight % or more, or 80 weight % or more, or 99 weight % or less, or 85 weight % or less. In one embodiment the amount of carrier liquid is 60-90 weight % such as 65-85 weight %.

The composition may further comprise an organic solvent, or a mixture of organic solvents. The composition may comprise a mixture of an organic solvent and a fatty acid or esterified fatty acid and/or an oil. The organic solvent may be but is not limited to oxygenates such as an alcohol, ester, ketone, ether, aldehydes, furane or furfural based solvent. Preferred solvents are C1-C10 alcohols, C1-C10 aldehydes, C2-C15 ketones, C2-C10 ethers, and C2-C10 esters. A non-limiting list of solvents is methanol, ethanol, propanol, isopropanol, glycerol, and butyl ether such as tert-butyl methyl ether; diethyl ether, diglyme, diisopropyl ether, dimethoxyethane, diethylene glycol, diethyl ether, polyethylene glycol, 1,4-dioxane and tetrahydrofuran, methylated tetrahydrofuran, mesityl oxide, furfural, isophorone. Preferred C2-C10 esters are organic esters, aromatic or non-aromatic esters, examples of esters are benzyl benzoate, various acetates such as methyl acetate, ethyl acetate, cyclopentyl methyl ether and butyl acetate, various lactates such as ethyl lactates. Solvents that are similar to or may be converted into fuel or petrol are interesting when the composition is to be used for fuel preparation. Such solvents could be ketones or aldehydes. In one embodiment the solvent is a C2-C15 ketone such as a C4-C12 ketone or a C6-C8 ketone. In one embodiment the solvent is a C1-C10 aldehyde such as a C4-C9 aldehyde or C6-C8 aldehyde. In one embodiment the solvent is a mixture of a C2-C15 ketone and a C1-C10 aldehyde. In one embodiment the solvent is mesityl oxide. In one embodiment the solvent is acetone. In one embodiment the solvent is acetophenone. In one embodiment the solvent is pentanone. In one embodiment the solvent is ethyl isopropyl ketone. In one embodiment the solvent is isophorone. In one embodiment the organic solvent is an aromatic aldehyde or a mixture containing an aromatic aldehyde for example furfural. In one embodiment the solvent comprises furfural or furfuryl alcohol. In one embodiment the solvent is benzaldehyde. In one embodiment the solvent is ethyl acetate. In one embodiment the solvent is ethanol. In one embodiment the solvent is methanol. In one embodiment the solvent is isopropanol. In one embodiment the solvent is solketal. In one embodiment the solvent is tetrahydrofuran or methylated tetrahydrofuran. In one embodiment the solvent is 1,4-dioxane.

In one embodiment the solvent comprises a combination of C1-C10 alcohols, C1-C10 ethers and C1-C10 esters. In one embodiment the solvent comprises two C1-C10 alcohols for example ethanol and glycerol, and in another embodiment the solvent comprises propanol and glycerol. In one embodiment the solvent comprises polyethylene glycol and a C1-C10 alcohol. When the solvent is a mixture of an organic solvent and water the mixture may contain methanol and water, ethanol and water, isopropanol and water or ethyl acetate and water, preferably ethanol and water, isopropanol and water and ethyl acetate and water.

In one embodiment the amount of organic solvent is 1-99 weight %. In one embodiment the amount of organic solvent is 70 weight % or less, or 40 weight % or less, or 20 weight % or less, or 10 weight % or less, or 5 weight % or less or 2 weight % or less of the total weight of the composition. In one embodiment the amount of solvent is 10-60 weight %, or 20-50 weight %. In some applications the amount of organic solvent should be as low as possible.

The present inventors found that by esterifying the hydroxyl groups of the lignin or lignin derivatives the solubility of the lignin increased drastically. The composition according to the present invention may be prepared by first preparing the esterified lignin or lignin derivative and then mixing said esterified lignin with the carrier liquid or solvent. The esterified lignin may be isolated from the esterification reaction mixture or the esterified lignin is left in the reaction mixture when mixed with the carrier liquid or solvent. The esterification of the lignin may also be performed in situ, i.e. in the carrier liquid or solvent. Then the lignin, the esterification agent or, the first fatty acid and an esterification agent, and the carrier liquid (or solvent) and optionally a catalyst are mixed to form a slurry or mixture. The slurry or mixture is then preferably heated between 50° C. and 350° C., such as 50° C. or higher, or 80° C. or higher or 100° C. or higher, or 120° C. or higher, or 150° C. or higher, but not higher than 350° C., or 250° C. or lower, or 200° C. or lower, or 180° C. or lower. The esterification of the lignin occurs in the carrier liquid leaving a homogenous composition of carrier liquid and esterified biomass, and optionally catalyst. The catalyst and any other unwanted components may be removed afterwards. The mixing can be done by stirring or shaking or in any other suitable way. When the esterification is performed in a carrier liquid comprising a first fatty acid and together with an esterification agent such as an anhydride the obtained esterified lignin is believed to comprise ester groups derived from the anhydride alone but also ester groups derived from an anhydride bond to a first fatty acid. In order to remove any acid groups of remaining fatty acids or fatty acids in the carrier liquid any suitable method may be used. For example an alcohol such as methanol may be added.

The esterified lignin may be isolated by precipitation in for example hexane or water. When the degree of substitution (esterification) is high, for example 50% or more, and the lignin is substituted with C2-C4 ester groups the esterified lignin may be treated with a base for example $NaHCO_3$ (aq) before precipitation in order to remove free acid. When the lignin is substituted with longer ester groups celite may be used. The esterified lignin according to the present invention may also be separated from metals and other additives or catalysts by simply rinsing the lignin in an aqueous solution or water. For many industries, for example the fuel refinery industry processing lignin, the amount of metals should be as low as possible since metals may damage the machinery or disturb the process. By forming the ester groups in situ, insoluble biomass may become soluble. For example lignin substituted with acetic ester groups is not dissolved in tall oil. However when forming the acetic ester in the tall oil the obtained homogenous mixture comprises 32 wt % of the formed lignin ester, see example 29.

The esterification agent may be a carboxylic acid or an anhydride. The esterification agents preferably contain an unsaturated bond. Non-limiting examples of carboxylic acids are fatty acids or C2-C42 carboxylic esters, preferably C4 to C22 such as C18, and non-limiting examples of anhydrides are C4 to C42 anhydrides. The ester groups may therefore be C2-C42 or C4-C42 preferably C4-C22 such as C18. Ester groups with longer chains tend to be more easily dissolved, especially in carrier liquids, and increases the C/O ratio. In one embodiment the ester groups is one or more C2-C42 groups, such as C6-C18 groups. Still, especially when using organic solvents, the ester groups may be C2-C18, or C2-C12, C12-C18 or C2-C6 since it was found that the solubility increased substantially even when using shorter ester groups, FIGS. 1 and 2. Another important factor is the availability and the cost of the esterification agent. The catalyst for the esterification may be a nitrogen containing aromatic heterocycle such as N-methyl imidazole or pyridine, or the catalyst may be a metal acetylacetonate such as $TiO(acac)_2$ or $Fe(acac)_3$. In table 1 and 2 the content of esterified lignin in different organic solvents and carrier liquids are presented.

In one embodiment the composition comprises a first fatty acid or oil and lignin or lignin derivatives; wherein at least one of the hydroxyl groups of the lignin or lignin derivatives have been substituted with ester groups of a second fatty acid, preferably an unsaturated second fatty acid, forming esterified lignin or lignin derivatives.

The hydroxyl groups of lignin may be divided into aliphatic hydroxyls (ROH), condensed phenol (PhOH), phenol and acids. The degree of substitution, i.e. the degree of hydroxyl groups that has been converted into ester groups, may be from 10% to 100%, for example 20% or more, 30% or more, or 40% or more, or 60% or more or 80% or more, or 99% or more, or 100%. It is also possible to have part of the lignin, or the hydroxyl groups on the lignin, being substituted with one type of ester group (for example C2-C6 ester groups) and another part substituted with another type of ester group (for example C8-C18 ester groups). For example 10-40% of the hydroxyl groups may be substituted with acetyl groups and 60-90% of the hydroxyl groups may be substituted with a fatty acid, preferably C12 or longer ester groups. When the composition comprises an organic solvent the degree of substitution does not have to be as high, for example 10-60% or 20-40%, in comparison when the composition comprises only a carrier liquid.

Lignin wherein the ester groups are unsaturated is oilier at room temperature while lignin substituted with a saturated ester group is more solid or wax like material. By having the lignin in oil phase there is no need to heat the lignin in order for it to dissolve in the wanted solvent. In order to keep the wax like lignin in solution it needs to be kept at the elevated temperature (for example 70° C.) which makes transportation and stock keeping more costly. This issue is solved with the present invention and instead the composition may be prepared at room temperature.

Substituting the hydroxyl groups of the lignin increases the solubility in organic solvents. The inventors found that even at low degree of substitution (0.3 equivalents, 25% degree of substitution) the lignin becomes soluble in ethyl acetate, methyl THF, cyclopentyl methyl ether and isopropanol. For the lignin to be dissolved in an oil such as light gas oil (LGO) the degree of substitution should be more than 30% for ester groups of C8 and longer, preferably 50% or more. If the carrier liquid is a mixture of a fatty acid and an oil the esterified lignin becomes more soluble. In one embodiment the composition is a one phase system.

The non-esterified groups may be capped for example with an anhydride such as acetic anhydride under common esterification conditions.

One advantage of the present invention is that a higher amount of lignin may be dissolved in a carrier liquid. The amount of esterified lignin or lignin derivatives in the composition according to the present invention may be 1 weight % or more, or 2 weight % or more, 4 weight % or more, or 5 weight % or more, 7 weight % or more, or 10 weight % or more, or 12 weight % or more, or 15 weight % or more, or 20 weight % or more, or 25 weight % or more, or 30 weight % or more, or 40 weight % or more, or 50 weight % or more, or 60 weight % or more, or 70 weight % or more, or 75 weight % or more based on the total weight of the composition.

In one embodiment the lignin or lignin derivatives are dearomatized. For example the lignin or lignin derivatives are dearomatized to at least 40%, or at least 50%, or at least 60%, or at least 70%, or at least 80%, or at least 90%, or at least 95%, or at least 99%.

The composition may further comprise at least one additive. The additive may be any additive known to a person skilled in the art. In one embodiment the additive may further enhance the dissolution of the lignin or lignin derivatives. The additive may have the function of dissolving or breaking up inter molecular bonds between the lignin chains or the lignin derivatives. In one embodiment the additive is a polar compound or a salt.

When the method of the present invention is performed using black or red liquor the liquor may be pre-treated by evaporation, separation or filtration or via chemical treatments such as the process described below and further defined in WO2012/121659.

The biomass, or the lignin or lignin derivatives in the composition may have been treated with the process described in WO2012/121659 which is hereby incorporated by reference. The process relates to reduction of a substrate wherein said substrate can be but is not limited to primary, secondary and tertiary benzylic or allylic alcohol, benzylic or allylic ether, benzylic or allylic carbonyl, and benzylic or allylic ester, or olefins to the corresponding hydrocarbon. The substrate may be lignin or any other compound or polymer comprising said functional group, or black or red liquor. A general method comprises adding a catalyst, a transition metal catalyst, to a reaction flask or container. Adding a solvent mixture of at least two solvents where one of the solvents is water and a base. The mixture is then heated followed by addition of a hydrogen donor and the substrate to be reduced. In order to inhibit disproportionation, a base or carbon dioxide should be added to the solvent mixture and catalyst prior to addition of a hydrogen donor and the substrate. The hydrogen donor may for example be formic acid or an alcohol, it may even be hydrogen gas. The reduction is performed at a temperature of 40-100° C. In one embodiment the amount of base is not stoichiometric to the amount of the substrate. The separated lignin and lignin derivatives obtained from the reduction method may then be used in the composition according to the present invention. In one embodiment the lignin or lignin derivatives from the chemical reduction is further treated with filtration, ultra-filtration or cross-flow ultra-filtration; or treated with acidification and separation such as the Lignoboost® technique.

In another embodiment the composition of the present invention may comprise lignin or lignin derivatives obtained through precipitation and separation of lignin and lignin derivatives for example by acidification and separation, such as filtration. Lignoboost® or any other similar separation technique are examples of such technique and may be used. The separated lignin and lignin derivatives may then be used as the biomass material in the composition according to the present invention. In another embodiment the separated lignin and lignin derivative may further be chemically reduced using the method described above and in WO2012/121659.

Another method or a complimentary method for purifying or separating lignin is through filtration, membrane-filtration, ultra-filtration or cross-flow ultra-filtration. The lignin may be separated in respect to size through any of said filtration techniques. The lignin or lignin derivatives may also be separated in respect to size through a depolymerisation technique; this separation may be performed in combination with filtration, ultra-filtration or cross-flow ultra-filtration. By using filtration, ultra-filtration or cross-flow ultra-filtration on black or red liquor lignin or lignin derivatives with molecular weights of 10,000 g/mol or less may be separated, preferably the separated lignin or lignin derivatives have a molecular weight of 2,000 g/mol or less, such as 1,000 g/mol or less. The separated lignin and lignin derivatives may then be used as the biomass material in the composition according to the present invention. In one embodiment the lignin and lignin derivatives obtained from said filtration may further be chemically reduced using the method described above and in WO2012/121659.

The composition according to the present invention may be used in a refinery process or as a pre-step to a refinery process for preparing fuel such as diesel and petrol, or diesel and petrol analogues; or biogasoline or biodiesel; or fuel additives. The composition may further be used to prepare lubricants, oils. For example synthetic oils with boiling point of at least 359° C.

The composition according to the present invention may also be used as an additive, for example as a concreted grinding aid, set retarder for cement, strengthener of cement, antioxidant, enhancer of thermal protection, stabilizer in asphalt, emulsifying agent, fiber strengthening additive, cross-linking agent, board binder, anti-corrosion additive, wear resistant additive, antifriction additive, binder, emulsifier or dispersing agent.

The composition may further be used to prepare foams, plastics, rubbers or paint. The esterified lignin may be used as a cross-linking or curing agent, or as a water absorption inhibitor or as a fluidization agent. Mechanical properties may also be enhanced by the use of the composition. The composition may further be used as a raw material for preparing fine chemicals such as aromatic compounds using conventional techniques.

The composition may be added to surfaces to obtain dust control, or the composition may be used to prepare batteries.

EXAMPLES

In some of the examples below the following lignin types have been used.

Lignin type A1: acid precipitated lignin from black liquor
Lignin type A2: acid precipitated lignin from black liquor dried to 95% dry weight
Lignin type A3: hexyl ester of acid precipitated lignin from black liquor
Lignin type B: filtered black liquor
Lignin type C: lignin chemically reduced using the method according to WO2012/121659

In the examples below the symbol "<" means that not all of the substrate for example lignin was dissolved.

Example 1

To a solution of ethyl acetate (0.1044 g) Lignin type A2-Ac-ester (0.1046 g) was added. The suspension was stirred under heating (70° C.). A pourable solution at 70° C. comprising 50 weight % of Lignin type A2-Ac-ester was attained.

Example 2

To a solution of ethanol (0.0858 g) Lignin type A2-Ac-ester (0.1086 g) was added. The suspension was stirred under heating (70° C.). A pourable solution at 70° C. comprising 56 weight % of Lignin type A2-Ac-ester was attained.

Example 3

To a solution of acetone (0.0592 g) Lignin type A2-Ac-ester (0.1012 g) was added. The suspension was stirred under heating (70° C.). A pourable solution at 70° C. comprising 63 weight % of Lignin type A2-Ac-ester was attained.

Example 4

To a solution of polyethylene glycol (0.1372 g) Lignin type A2-Ac-ester (0.0986 g) was added. The suspension was stirred under heating (70° C.). A pourable solution at 70° C. comprising 42 weight % of Lignin type A2-Ac-ester was attained.

Example 5

To a solution of glycerol (1.1634 g) Lignin type A2-Ac-ester (0.1032 g) was added. The suspension was stirred under heating (70° C.). A solution comprising <8 weight % of Lignin type A2-Ac-ester was attained.

Example 6

To a solution of 2-methyltetrahydrofuran (0.0865 g) Lignin type A2-Ac-ester (0.0981 g) was added. The suspension was stirred under heating (70° C.). A pourable solution at 70° C. comprising 53 weight % of Lignin type A2-Ac-ester was attained.

Example 7

To a solution of cyclopentyl methyl ether (0.7775 g) Lignin type A2-Ac-ester (0.1027 g) was added. The suspension was stirred under heating (70° C.). A solution comprising <12 weight % of Lignin type A2-Ac-ester was attained.

Example 8

To a solution of 1,3-propanediol (1.5005 g) Lignin type A2-Ac-ester (0.1063 g) was added. The suspension was stirred under heating (70° C.). A solution comprising <7 weight % of Lignin type A2-Ac-ester was attained.

Example 9

To a solution of 1,3-dioxolane (0.0905 g) Lignin type A2-Ac-ester (0.1043 g) was added. The suspension was stirred under heating (70° C.). A pourable solution at 70° C. comprising 54 weight % of Lignin type A2-Ac-ester was attained.

Example 10

To a solution of dipropylene glycol (0.1142 g) Lignin type A2-Ac-ester (0.1038 g) was added. The suspension was stirred under heating (70° C.). A pourable solution at 70° C. comprising 48 weight % of Lignin type A2-Ac-ester was attained.

Example 11

To a solution of dipropylene glycol (0.1631 g) Lignin type A2-Ac-ester (0.1057 g) was added. The suspension was stirred under heating (70° C.). A pourable solution at 70° C. comprising 39 weight % of Lignin type A2-Ac-ester was attained.

Example 12

To a solution of 1,4-dioxane (0.0772 g) Lignin type A2-Ac-ester (0.0987 g) was added. The suspension was stirred under heating (70° C.). A pourable solution at 70° C. comprising 56 weight % of Lignin type A2-Ac-ester was attained.

Example 13

To a solution of methanol (0.0693 g) Lignin type A2-Ac-ester (0.0986 g) was added. The suspension was stirred under heating (70° C.). A pourable solution at 70° C. comprising 59 weight % of Lignin type A2-Ac-ester was attained.

Example 14

To a solution of isopropanol (0.9031 g) Lignin type A2-Ac-ester (0.1064 g) was added. The suspension was stirred under heating (70° C.). A solution comprising <11 weight % of Lignin type A2-Ac-ester was attained.

Example 15

To a solution of dimethylsulfoxide (0.0995 g) Lignin type A2-Ac-ester (0.1034 g) was added. The suspension was stirred under heating (70° C.). A pourable solution at 70° C. comprising 51 weight % of Lignin type A2-Ac-ester was attained.

Example 16

To a solution of tetrahydrofuran (0.0856 g) Lignin type A2-Ac-ester (0.1063 g) was added. The suspension was stirred under heating (70° C.). A pourable solution at 70° C. comprising 55 weight % of Lignin type A2-Ac-ester was attained.

Example 17

To a solution of pyridine (0.1008 g) Lignin type A2-Ac-ester (0.1080 g) was added. The suspension was stirred under heating (70° C.). A pourable solution at 70° C. comprising 52 weight % of Lignin type A2-Ac-ester was attained.

Example 18

To a solution of acetic acid (0.0887 g) Lignin type A2-Ac-ester (0.0986 g) was added. The suspension was stirred under heating (70° C.). A pourable solution at 70° C. comprising 53 weight % of Lignin type A2-Ac-ester was attained.

Example 19

To a solution of hexanoic acid (1.1881 g) Lignin type A2-Ac-ester (0.1080 g) was added. The suspension was stirred under heating (70° C.). A solution comprising <8 weight % of Lignin type A2-Ac-ester was attained.

Example 20

To a solution of isophorone (0.0835 g) Lignin type A2-Ac-ester (0.1021 g) was added. The suspension was stirred under heating (70° C.). A pourable solution at 70° C. comprising 55 weight % of Lignin type A2-Ac-ester was attained.

Example 21

To a solution of mesityl oxide (0.0670 g) Lignin type A2-Ac-ester (0.1025 g) was added. The suspension was stirred under heating (70° C.). A pourable solution at 70° C. comprising 60 weight % of Lignin type A2-Ac-ester was attained.

Example 22

To a vial containing Lignin type A2 (0.2079 g) 1-methylimidazole (0.020 g), acetic anhydride (0.2046 g), and a mixture comprising free fatty acids (0.2977 g) was added. The suspension was stirred under heating (100° C., 24 h). A pourable solution at 70° C. comprising 28 weight % of Lignin type A2 was attained.

Example 23

To a vial containing Lignin type A2 (0.1932 g) 1-methylimidazole (0.020 g), acetic anhydride (0.2028 g), and a mixture comprising free fatty acids (0.4341 g) was added. The suspension was stirred under heating (100° C., 24 h). A pourable solution at 70° C. comprising 23 weight % of Lignin type A2 was attained.

Example 24

To a suspension comprising free fatty acids and Lignin type C lignin (0.1084 g) acetic anhydride as well as 1-methylimidazole (2 drp) was added. The suspension was stirred under heating (70° C., 1 h). A solution comprising 10 weight % Lignin type C was attained.

Example 25

To a suspension of gas oil and Lignin type C lignin (0.0995 g) acetic anhydride, a mixture comprising free fatty acids as well as 1-methylimidazole (2 drp) was added. The suspension was stirred under heating (70° C., 1 h). A solution comprising 9 weight % Lignin type C was attained.

Example 26

To a solution of gas oil (0.0584 g) Lignin type A2-Myr-ester (0.0195 g) (Myr is a C14 fatty acid) was added. The suspension was stirred under heating (70° C.). A pourable solution at 70° C. comprising 25 weight % of Lignin type A2-Myr-ester was attained.

Example 27

To a solution of hexanoic anhydride (0.9108 g) and 1-methylimidazole (0.0160 g) Lignin type A1 (0.407 g) was added. The suspension was stirred under heating (120° C.) for 2 h forming an esterified lignin. Upon cooling a solution comprising 30.9 weight % of Lignin type A1 was attained. The solution was then dissolved in a mixture of fatty acid derived from biomass in a 1:1 ratio yielding a solution comprising 15 weight % of Lignin type A1.

Example 28

To a solution of hexanoic anhydride (0.4 g) and a mixture comprising fatty acids (0.4 g) derived from biomass, Lignin type A2 (0.4 g) was added, as well as two drops of 1-methylimidazole. The suspension was stirred under heating (120° C.) for 2 h forming an esterified lignin. A pourable solution at 70° C. comprising 33 weight % of Lignin type A2 was attained.

Example 29

To a solution of acetic anhydride (0.2060 g) and a mixture comprising fatty acids (0.2278 g) derived from biomass, the Lignin type A2 (0.2034 g) was added, as well as two drops of 1-methylimidazole. The suspension was stirred under heating (100° C.) for 24 h. A pourable solution at 70° C. comprising 32 weight % of Lignin type A2 was attained.

Example 30

To a solution of hexanoic anhydride (0.2040 g) and a mixture comprising fatty acids (0.2189 g) derived from biomass, Lignin type A2 (0.2007 g) was added, as well as two drops of 1-methylimidazole. The suspension was stirred under heating (100° C.) for 24 h. A pourable solution at 70° C. comprising 32 weight % of Lignin type A2 was attained.

Example 31

To a solution of ethyl acetate (0.1398 g) Lignin type A3 (0.0961 g) was added. The suspension was stirred under heating. A pourable solution at 70° C. comprising 41 weight % of Lignin type A3 was attained.

Example 32

To a solution of acetone (0.0885 g) Lignin type A3 (0.1038 g) was added. The suspension was stirred under heating. A pourable solution at 70° C. comprising 54 weight % of Lignin type A3 was attained.

Example 33

To a solution of polyethylene glycol (1.3309 g) Lignin type A3 (0.1021 g) was added. The suspension was stirred under heating. A pourable solution at 70° C. comprising <7 weight % of Lignin type A3 was attained.

Example 34

To a solution of 2-methyltetrahydrofuran (0.1085 g) Lignin type A3 (0.1013 g) was added. The suspension was stirred under heating. A pourable solution at 70° C. comprising 48 weight % of Lignin type A3 was attained.

Example 34

To a solution of cyclopentyl methylether (0.1124 g) Lignin type A3 (0.0996 g) was added. The suspension was stirred under heating. A pourable solution at 70° C. comprising 47 weight % of Lignin type A3 was attained.

Example 35

To a solution of 1,3-dioxolane (0.0967 g) Lignin type A3 (0.1006 g) was added. The suspension was stirred under heating. A pourable solution at 70° C. comprising 51 weight % of Lignin type A3 was attained.

Example 36

To a solution of furfural (0.1727 g) Lignin type A3 (0.1040 g) was added. The suspension was stirred under heating. A pourable solution at 70° C. comprising 38 weight % of Lignin type A3 was attained.

Example 37

To a solution of dipropylene glycol (0.2092 g) Lignin type A3 (0.1032 g) was added. The suspension was stirred under heating. A pourable solution at 70° C. comprising 33 weight % of Lignin type A3 was attained.

Example 38

To a solution of 1,4-dioxane (0.1260 g) Lignin type A3 (0.0969 g) was added. The suspension was stirred under heating. A pourable solution at 70° C. comprising 43 weight % of Lignin type A3 was attained.

Example 39

To a solution of methanol (0.1022 g) Lignin type A3 (0.1044 g) was added. The suspension was stirred under heating. A pourable solution at 70° C. comprising 51 weight % of Lignin type A3 was attained.

Example 40

To a solution of isopropanol (0.0775 g) Lignin type A3 (0.0955 g) was added. The suspension was stirred under heating. A pourable solution at 70° C. comprising 55 weight % of Lignin type A3 was attained.

Example 41

To a solution of dimethyl sulfoxide (0.2907 g) Lignin type A3 (0.1037 g) was added. The suspension was stirred under heating. A pourable solution at 70° C. comprising 26 weight % of Lignin type A3 was attained.

Example 42

To a solution of tetrahydrofuran (0.1065 g) Lignin type A3 (0.0974 g) was added. The suspension was stirred under heating. A pourable solution at 70° C. comprising 48 weight % of Lignin type A3 was attained.

Example 43

To a solution of pyridine (0.1183 g) Lignin type A3 (0.0993 g) was added. The suspension was stirred under heating. A pourable solution at 70° C. comprising 46 weight % of Lignin type A3 was attained.

Example 44

To a solution of acetic acid (0.1460 g) Lignin type A3 (0.1014 g) was added. The suspension was stirred under heating. A pourable solution at 70° C. comprising 41 weight % of Lignin type A3 was attained.

Example 45

To a solution of hexanoic acid (0.1527 g) Lignin type A3 (0.1040 g) was added. The suspension was stirred under heating. A pourable solution at 70° C. comprising 41 weight % of Lignin type A3 was attained.

Example 46

To a mixture (0.2077 g) mainly comprising fatty acid derived from biomass, Lignin type A3 (0.0927 g) was added. The suspension was stirred under heating. A pourable solution at 70° C. comprising 31 weight % of Lignin type A3 was attained.

Example 47

Anhydride of Tall Oil Fatty Acids.

To tall oil fatty acids (10.00 g, 1 eq) in dichloromethane (20 ml) was added dicyclohexylcarbodiimide (4.13 g, ca 0.5 eq) in one portion. The reaction was stirred under argon at room temperature for 6 h, followed by addition of pentane (20 ml), filtering and washing the solids with pentane (15 ml). The clear liquids were combined and solvent was evaporated to give 10.66 g of crude anhydride of tall oil fatty acids as thick slightly yellow oil.

Example 48

Acetic Acid Ester.

To a stirred suspension of Lignin type A2 (5.00 g) and acetic anhydride (50 ml) pyridine (50 ml) was added in two portions. The atmosphere was replaced by argon and stirring was continued overnight at room temperature. Solution was cooled in ice bath and cold methanol (150 ml) was added. After evaporating the solvent, the residue was co-evaporated several times with toluene until solid material was obtained. The residue was dissolved in dichloromethane and precipitated with heptane. The clear solution was decanted, the solids were powdered and dried thoroughly in a desiccator under high vacuum over KOH to give 6.89 g of the acetyl ester as brown powder.

Example 49

Lauric Acid Ester.

Lignin type A2 (1.00 g, 1 equivalent), lauric anhydride (4.25 g, 2 eq) and dioxane (10 ml) were stirred under argon and 1-methylimidazole (0.1 ml) was added. The reaction was continued at 80° C. overnight. After cooling to room temperature the liquid was poured into vigorously stirred water (130 ml). The liquid was decanted and the residue was redissolved in tetrahydrofuran and the product was precipitated with water. The decantation and the precipitation were repeated once more. The crude product was dried, redissolved in chloroform and adsorbed on celite (32 g). After thorough drying the solids were stirred with aqueous 0.5 M solution of NaHCO$_3$ (400 ml) overnight under argon. This treatment transformed free carboxylic acid to its corresponding sodium salt having higher affinity to celite than lignin ester. In some cases it was required to add tetrahydrofuran until solids were wetted to ensure faster neutralisation of the free acid.

The celite with adsorbed product was filtered, washed with water and dried under vacuum. The ester was washed off with hexane to give 1.32 g of the lauric acid ester as brown residue after evaporation of the solvent.

Example 50

Caproic Acid Ester.

According to the general procedure of esterification (see Example 49), with modifications, following amounts were used: Lignin type A2 (1.00 g, 1 eq), caproic anhydride (12.8 ml, 2 eq.), 1-methylimidazole (0.44 ml, 0.2 eq.) and dioxane (30 ml). A part of the product was precipitated by pouring into hexane (500 ml) under sonication. The solids were filtered, redissolved in dioxane (10 ml) and poured into hexane (200 ml). The precipitation was repeated once more to give 4.41 g of hexanoic anhydride ester as yellowish powder.

The dark brown supernatants after precipitation were combined, suspended with celite (100 g) and solvent was evaporated thoroughly. To the obtained powder was added aqueous 0.5 M solution of NaHCO$_3$ (800 ml) and the resulting suspension was stirred under argon overnight. After filtering the solids, washing with water and drying under vacuum the remaining ester was washed off with tetrahydrofuran:hexane 1:1 to give 3.26 g of brown residue after evaporation of the solvents. This product was combined with the ester isolated after hexane precipitation, dissolved in 20 ml dioxane and freeze dried to give 7.24 g of hexanoic acid ester as light brown sponge.

Example 51

Cis-3-Hexenoic Acid Ester.

Same procedure as for caproic acid ester, except that following amounts were used: Lignin type A2 (1.00 g, 1 eq.), cis-3-hexenoic acid anhydride (2.34 g, 2 eq.), 1-methylimidazole (0.1 ml) and dioxane (10 ml). The precipitation afforded 1.22 g of the ester. Subsequent purification of the precipitation supernatants by celite (20 g) and a solution of NaHCO$_3$ (200 ml) as described in caproic acid ester synthesis afforded 0.2 g of brown residue. Combination of these two fractions of products and freeze drying from 10 ml dioxane afforded 1.4 g of cis-3-hexenoic acid ester as brown solid.

Example 52

Myristic Acid Esters.

Partial substitutions: According to the general procedure of esterification, following amounts were used: Lignin type A2 (1.00 g, 1 eq), myristic anhydride (0.24 or 0.73 g, 0.1 or 0.3 eq), 1-methylimidazole (0.1 ml) and dioxane (5 ml). After the reaction the esters were purified according to procedures below.

Example 53

Purification Procedure of Partially Substituted Esters:

0.1-eq reaction was poured into hexane (50 ml) under sonication. After filtering, the solids were redissolved in dioxane (5 ml) and precipitation was repeated once more to give 1.12 g of the ester as brown powder. 0.3-eq reaction was worked up in the same way to give 1.23 g of the ester as brown powder. Generally 1-3 precipitations were sufficient for all partially substituted esters to give a product free from the carboxylic acid. The presence of free carboxylic acid was monitored using TLC on silica-coated plates using hexane:ethyl acetate:acetic acid as the eluent.

In some cases centrifuge was used to separate solid product.

Example 54

Stearic Acid Esters.

Full substitution: According to the general procedure of esterification, following amounts were used: Lignin type A2 (1.00 g, 1 eq), stearic anhydride (6.12 g, 2 eq), 1-methylimidazole (0.1 ml) and dioxane (15 ml). For purification, celite (50 g) was used with 0.5 M solution of $NaHCO_3$ (400 ml). Some tetrahydrofuran was added to wet the celite. The ester was washed off with neat hexane to give 1.97 g of stearic acid ester as a brown solid.

Partial substitutions: According to the general procedure of esterification, following amounts were used: Lignin type A2 (1.00 g, 1 eq), stearic anhydride (0.31 or 0.92 g, 0.1 or 0.3 eq), 1-methylimidazole (0.1 ml) and dioxane (10 ml). After the reaction the esters were purified according to the general purification of partially substituted esters. 0.1 and 0.3-eq reactions afforded 1.12 g and 1.01 g respectively of the corresponding esters as brown powders.

Example 55

Oleic Acid Esters.

Full substitution: According to the general procedure of esterification, following amounts were used: Lignin type A2 (1.00 g, 1 eq), oleic anhydride (6.08 g, 2 eq), 1-methylimidazole (0.1 ml) and dioxane (10 ml).

The product was purified by dissolving in chloroform and washing with water followed by celite purification. For further purification celite (50 g) was used with 0.5 M solution of $NaHCO_3$ (400 ml). The ester was washed off with neat hexane to give 2.49 g of oleic acid ester as brown thick oil.

Partial substitutions: According to the general procedure of esterification, following amounts were used: Lignin type A2 (1.00 g, 1 eq), oleic anhydride (0.30 or 0.91 g, 0.1 or 0.3 eq), 1-methylimidazole (0.1 ml) and dioxane (10 ml). After the reaction the esters were purified according to the general purification of partially substituted esters. 0.1 and 0.3-eq reactions afforded 1.13 g and 1.18 g respectively of the corresponding esters as brown powders.

Example 56

Behenic Acid Esters.

Full substitution: According to the general procedure of esterification, following amounts were used: Lignin type A2 (1.00 g, 1 eq.), behenic anhydride (7.37 g, 2 eq.), 1-methylimidazole (0.1 ml) and dioxane (20 ml). The product was purified by dissolving in chloroform and washing with water followed by celite purification. For further purification, celite (50 g) was used with 0.5 M solution of $NaHCO_3$ (400 ml).

Some tetrahydrofuran was added to wet the celite. The ester was washed off with hexane:tetrahydrofuran 1:1 to give 2.62 g of behenic acid ester as a brown solid.

Partial substitutions: According to the general procedure of esterification, following amounts were used: Lignin (1.00 g, 1 eq), behenic anhydride (0.37 or 1.11 g, 0.1 or 0.3 eq), 1-methylimidazole (0.1 ml) and dioxane (10 ml). After the reaction the esters were purified according to the general purification of partially substituted esters. 0.1 and 0.3-eq reactions afforded 1.15 g and 1.20 g respectively of the corresponding esters as brown powders.

Example 57

Erucic Acid Esters.

Full substitution: According to the general procedure of esterification, following amounts were used: Lignin type A2 (1.00 g, 1 eq.), erucic anhydride (5.49 g, 1.5 eq.), 1-methylimidazole (0.1 ml) and dioxane (15 ml). The product was purified by dissolving in chloroform and washing with water, followed by celite purification. For further purification, celite (50 g) was used with 0.5 M solution of $NaHCO_3$ (400 ml). Some tetrahydrofuran was added to wet the celite. The ester was washed off with hexane to give 2.57 g of erucic acid ester as brown thick oil.

Partial substitutions: According to the general procedure of esterification, following amounts were used: Lignin type A2 (1.00 g, 1 eq), erucic anhydride (0.37 or 1.10 g, 0.1 or 0.3 eq), 1-methylimidazole (0.1 ml) and dioxane (10 ml). After the reaction the esters were purified according to the general purification of partially substituted esters. 0.1 and 0.3-eq reactions afforded 1.13 g and 1.17 g respectively of the corresponding esters as brown powders.

Example 58

Tall Oil Fatty Acid Ester.

According to the general procedure of esterification, following amounts were used: Lignin type A2 (1.00 g, 1 eq.), anhydride of tall oil fatty acids (5.36 g, ca 2 eq.), 1-methylimidazole (0.1 ml) and dioxane (10 ml). Product was purified by dissolving in chloroform and washing with water. For further purification, celite (50 g) was used with 0.5 M solution of $NaHCO_3$ (400 ml). The ester was washed off with hexane to give 3.91 g of tall oil fatty acid ester as brown thick oil.

Example 59

Solubility of Lignin Esters in Different Carrier Liquids

The solubility was evaluated by adding ~100 mg of lignin or esterified lignin to a HPLC vial followed by the addition of a small amount of solvent or carrier liquid (~3 drops or less). The vial was then put in a shaker at 70° C. and 900 rpm for about 1 h. If the lignin was not dissolved and pourable at 70° C. then more solvent or carrier liquid was added (3 drops or less) and put on shaker for a further 30 min. The final step was repeated until the mixture was pourable at 70° C. or the vial being full. The results are present in FIGS. 1, 2A and 2B. The esterified lignins of FIG. 1 have not been purified while the esterified lignins of FIGS. 2A and 2B have either been precipitated in hexane or purified using Celite.

(EA=ethyl acetate, EtOH=ethanol, MeTHF=methylated tetrahydrofuran, CPME=cyclocpentyl methyl ether, iPrOH=iso-propanol, RTD=tall oil, LGO=light gas oil, CF=membrane filtered lignin, LGTPA=acid precipitated lignin from black liquor dried to 95% dry weight and GM63=lignin chemically reduced using the method according to WO2012/121659)

Example 60

Esterification with TiO(acac)$_2$

Lignin type A2 (0.5 g), oleic acid (1.5 g) and TiO(acac)$_2$ (50 mg, 10 wt %) was added to a round bottom flask in a distillation setup. The mixture was initially heated under stirring to 140° C. overnight. The following night the reaction was continued but with vacuum (>50 mbar) applied and 140° C. The following night the reaction was continued with vacuum but at 180° C. The reaction was followed by GPC, FIG. 3.

Example 61

Esterification with Fe(acac)$_3$

Lignin type A2 (180 mg, 1.00 mmol), oleic acid (894 mg, 3.17 mmol) and Fe(acac)$_3$ (35 mg, 0.10 mmol) was added to a round bottom flask in a distillation setup. The mixture was heated under stirring and vacuum to 180° C. for 30 h. The experiment was repeated and heated under vacuum for 3 days. See FIG. 4.

Example 62

Conversion of the Composition into Diesel Fuel

A composition according to the present invention comprising 100% esterified lignin in RTD and LGO was treated in a hydrotreater. The obtained product remained well into EN590 specifications for road diesel.

Example 63

Up-Scaled Preparation

Lignin type A2 was extracted using iso-propanol. The isolated extracted lignin (15 kg) was esterified using oleic acid (64 kg), Ac$_2$O (Acetic anhydride) (48 kg) and 1-methylimidazole (2.6 kg) according to previously described method. The Ac$_2$O and imidazole was distilled off and a composition of 19% lignin in oleic acid was obtained.

Example 64

300 g of the esterified lignin of Example 63 was mixed with 200 ml of hot methanol and 300 mg of Dowex 2X and heated over night at 80° C. The excess MeOH was evaporated and the rest was dissolved in 300 mL hexane and filtered. Hexane was evaporated and the formulation was analysed according to the rest of carboxylic acids (HMBC).

The esterification of the fatty acid was confirmed using GPC and NMR.

Example 65

300 g of the Lignin type A2 was mixed with 200 ml of hot methanol and 300 mg of Dowex 2X and heated over night at 80° C. The excess MeOH was evaporated and the rest was dissolved in 300 mL hexane and filtered. Hexane was evaporated and the formulation was analysed according to the rest of carboxylic acids (HMBC).

The esterification of the fatty acid was confirmed using GPC and NMR.

Example 66

A mixture of organosolv lignin (28 mg, 1 eq, 0.156 mmol), oleic anhydride (170 mg, 2 eq, 0.311 mmol), dioxane (1 ml) and 1-methylimidazole (1 drop) was heated with stirring at 80° C. under argon for 22 h. The reaction was cooled and solvent removed under vacuum to give 202 mg of organosolv ester as a clear orange-yellow oil. The product was miscible with hexane, LGO and RTD.

The invention claimed is:

1. A composition comprising a carrier liquid and lignin or lignin derivatives solubilized in said carrier liquid; wherein the hydroxyl groups of the lignin or lignin derivatives have been substituted with ester groups forming esterified lignin or lignin derivatives and wherein the degree of substitution is more than 30%, wherein the ester groups are C8 or longer groups and wherein the amount of the esterified lignin or lignin derivative in composition is 1 weight % or more; and wherein the carrier liquid is a gas oil.

2. The composition according to claim 1 wherein the amount of the esterified lignin or lignin derivatives in the composition is 2 weight % or more.

3. The composition according to claim 1 wherein the hydroxyl groups of the lignin has been substituted to a degree of substitution of 40% or more.

4. The composition according to claim 1 wherein the lignin or lignin derivative has a weight average molecular weight of not more than 2,000 g/mol.

5. The composition according to claim 1 wherein the carrier liquid is light gas oil (LGO).

6. The composition according to claim 1 wherein the hydroxyl groups of the lignin or lignin derivatives have been substituted with ester groups of an unsaturated fatty acid.

7. The composition according to claim 1 wherein the composition comprises 20 weight % or more of the carrier liquid.

8. The composition according to claim 1 wherein composition comprises at least 40 wt % of the carrier liquid and wherein the amount of the esterified lignin or lignin derivatives in the composition is at least 2 wt %.

9. A method for making fuel by treating the composition according to claim 1 in a hydrotreater or a catalytic cracker.

10. A fuel obtained from the composition according to claim 1.

11. A lubricant obtained from the composition according to claim 1.

12. A method of preparing the composition according to claim 1 wherein the method comprises the steps:
   a. providing a gas oil, and lignin or lignin derivatives;
   b. providing a C8 or longer esterification agent and optionally a catalyst;
   c. mixing the components of step a and b to form a slurry;
   d. heating the mixture; and
   e. letting the components react in order to form a homogenous composition of esterified lignin or lignin derivatives in a gas oil.

13. The method according to claim 12 wherein esterification agent is an anhydride.

14. The method according to claim 12 wherein an imidazole or an acid is added as a catalyst.

15. The method according to claim 12 wherein the mixture is heated to at least 80° C.

16. The method according to claim 12 wherein the mixture is heated to at least 120° C.

17. The composition according to claim 1 wherein the amount of the esterified lignin or lignin derivatives in the composition is 10 weight % or more.

18. The composition according to claim 1 wherein the amount of the esterified lignin or lignin derivatives in the composition is 20 wt % or more.

19. The composition according to claim 1 wherein the hydroxyl groups of the lignin has been substituted to a degree of substitution of 60% or more.

20. The composition according to claim 1 wherein the hydroxyl groups of the lignin has been substituted to a degree of substitution of 80% or more.

21. The composition according to claim 1 wherein the hydroxyl groups of the lignin has been substituted to a degree of substitution of 99% or more.

22. The composition according to claim 1 wherein the hydroxyl groups of the lignin has been substituted to a degree of substitution of 100%.

23. The composition according to claim 1 wherein the composition comprises 40 weight % or more of the carrier liquid.

24. The composition according to claim 1 wherein the composition comprises 80 weight % or more of the carrier liquid.

* * * * *